United States Patent [19]

Beatty

[11] Patent Number: 5,042,646

[45] Date of Patent: Aug. 27, 1991

[54] PIPE CONVEYOR APPARATUS

[75] Inventor: Robert A. Beatty, Brisbane, Australia

[73] Assignee: R.A. Beatty & Associates Pty. Ltd., Camira, Australia

[21] Appl. No.: 421,103

[22] Filed: Oct. 13, 1989

[51] Int. Cl.⁵ .............................................. B65G 15/08
[52] U.S. Cl. ..................... 198/819; 198/811
[58] Field of Search ............... 198/819, 811, 823, 827, 198/861.2

[56] References Cited

U.S. PATENT DOCUMENTS

| | | | |
|---|---|---|---|
| 4,526,272 | 7/1985 | Peterson | 198/819 |
| 4,723,653 | 2/1988 | Engst | 198/819 |
| 4,747,344 | 5/1988 | Hashimoto et al. | 198/819 X |
| 4,778,046 | 10/1988 | Hashimoto et al. | 198/819 |

FOREIGN PATENT DOCUMENTS

| | | |
|---|---|---|
| 91503/82 | 12/1982 | Australia . |
| 41263/85 | 4/1985 | Australia . |
| 41272/85 | 4/1985 | Australia . |
| 60118/86 | 7/1986 | Australia . |
| 87/4189 | 6/1987 | South Africa . |
| 1270065 | 11/1986 | U.S.S.R. ............................. 198/819 |

*Primary Examiner*—Robert P. Olszewski
*Assistant Examiner*—Cheryl L. Gastineau
*Attorney, Agent, or Firm*—Nixon & Vanderhye

[57] ABSTRACT

Pipe conveyor apparatus which includes an endless conveyor belt having a forward part and a return part. A section of the forward part is arranged into a substantially continuous form and a section of the return part is also arranged into a substantially continuous form. In accordance with the invention, the forward section is surrounded by the return section. Preferably, there is also provided a plurality of articulated structure components and a plurality of support frames wherein each structure component is interposed between adjacent support frames and pivotally attached to each adjacent and support frame. The apparatus for arranging the forward form may also function as a spacer between the forward part and the return part to maintain both the return part and the forward part in a spaced and co-axial orientation.

17 Claims, 11 Drawing Sheets

PIPE CONVEYOR APPARATUS

This invention relates to pipe conveyor apparatus suitable for conveying particular materials to a desired location.

A conventional pipe conveyor apparatus comprises a forward run and a return run wherein material is loaded onto the conveyor at a loading location and discharged therefrom at a discharge facility. Usually in this regard the return run was located below the forward run and spaced therefrom. Normally there were provided head rollers at both the loading location and the discharge location one or both of which was power driven. There was also usually provided suitable support structure for both the forward run and return run and in one form this comprised a plurality of support frames each having an upper aperture or passage for travel therethrough of the forward run and a lower aperture or passage for travel therethrough of the return run. Associated with each of the passages were a plurality of peripheral rollers which contacted the belt so as to form it into a cylindrical shape. In this regard usually the belt was a flat or substantially planar endless belt having opposed side edges which were forced into overlapping relationship by the plurality of peripheral rollers.

One problem associated with such conventional pipe conveyor apparatus was that erection of the support frame having the aforesaid upper and lower passages was time consuming and expensive and thus installation of such conventional pipe conveyor apparatus particularly in relation to mining applications was very capital intensive. Also such a plurality of support frames were very heavy and cumbersome. Examples of such conventional pipe conveyor apparatus is that described in South African Patent 87/04189, Australian Patent Specifications 60118/86 and 91503/82, U.S. Pat. No. 4747344 and U.S. Pat. No. 4526272.

In another arrangement universal joints were proposed for pivotally connecting upper and lower frames in a movable pipe conveyor as described in Australian Patent Specification 41263/85 and Australian Patent Specification 41272/85. However the upper frame usually included an upper space for passage of the forward run of the conveyor and the lower frame included a lower space for passage of the return run. Thus the same disadvantages as described above were also relevant to this prior art.

Other disadvantages of prior art pipe conveying apparatus included the fact that often there was insufficient internal support for the return run. This meant the conveyor belt could not be taken around a sharp curve because it relied upon the natural spring or bias of the belt to keep the belt in contact with the peripheral rollers or idlers. If the curve was too sharp or acute then the return run could collapse against the support frame and this caused tangling of the belt.

Another problem was that conventional pipe conveyor apparatus followed a set or predetermined path and thus was not suited for following a continuously changing or continuously variable path.

The pipe conveyor apparatus of the invention therefore includes an endless conveyor belt having a forward part and a return part and forward forming means for forming a section of the forward part into a substantially continuous (e.g. cylindrical) form. There also may be provided return forming means for forming a section of the return part into a substantially continuous (e.g. cylindrical) form characterized in that the substantially continuous forward section is surrounded by the substantially continuous return section.

The return forming means may include one and more suitably a plurality of peripheral sets of rollers which may be supported by one but more suitably a plurality of support frames spaced from each other along the length of the belt. In this arrangement the or each set of peripheral rollers may contact an outer surface of the return part.

There also may be provided means for causing opposed side edges of the forward part to overlap or be located adjacent to each other suitably in relatively close proximity. In one form a suitably overlapping means may be an overlapping roller suspended by the one or more support frames referred to above which maintain the adjacent side edges of the forward part in overlapping relationship.

There also may be provided means for maintaining opposed side edges of the return part in relative close proximity and this may comprise a pair of edge rollers for bearing contact against an associated side edge of the return part.

The forward forming means may also suitably act as a spacer means between the forward part and the return part to maintain both return part and forward part in a spaced and co-axial orientation. Various forms of forward forming means may be adopted for this purpose including a set of peripheral rollers which contact the underside of the forward part and may be interposed between the forward part and the return part. Alternatively a rotatably supported curved axle may be used having a multiplicity of support discs attached thereto which are also interposed between the forward part and the return part. In yet another variation compressed air may be utilized as a suitable spacer means as described hereinafter in regard to the drawings.

In another embodiment there may be provided a plurality of articulated structure components which may be interposed between adjacent support frames. This enables adjacent articulated structure components of the pipe conveyor apparatus to be pivoted with respect to each other. In this embodiment each structure component may be pivotally attached by means of a universal joint to a rear support frame as well as a front or forward support frame.

Reference may now be made to preferred embodiments of the invention as shown in the attached drawings wherein.

Figure 10:
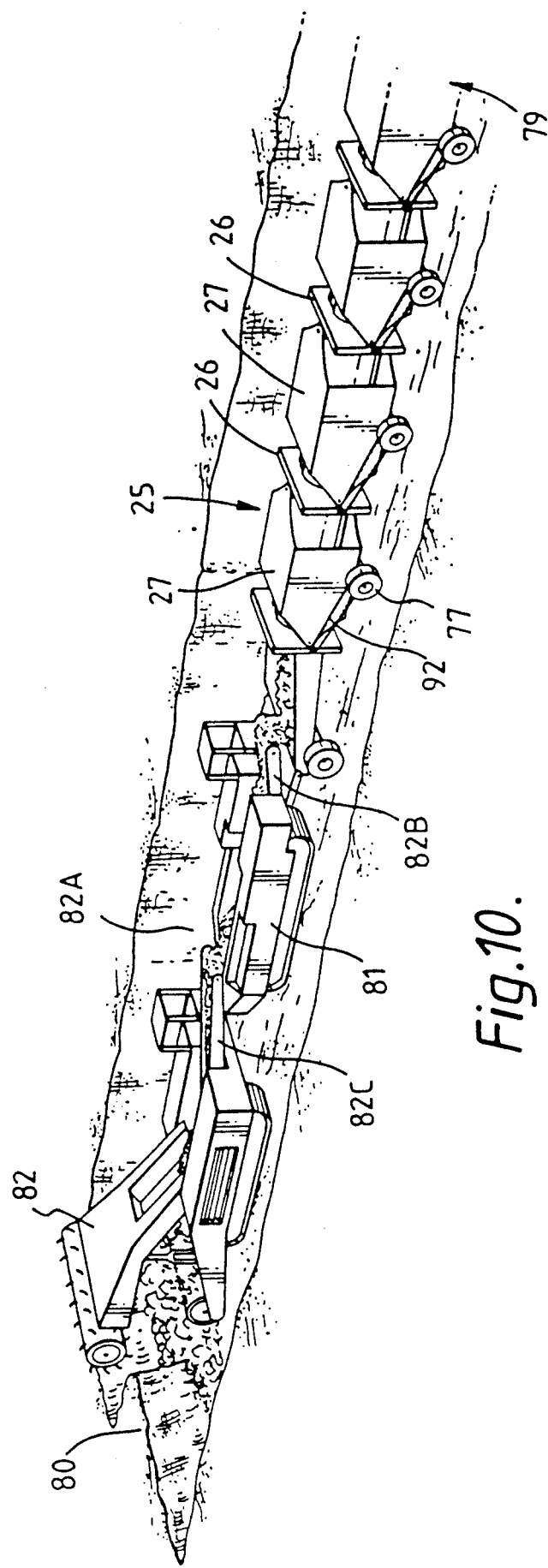
Figure 11:
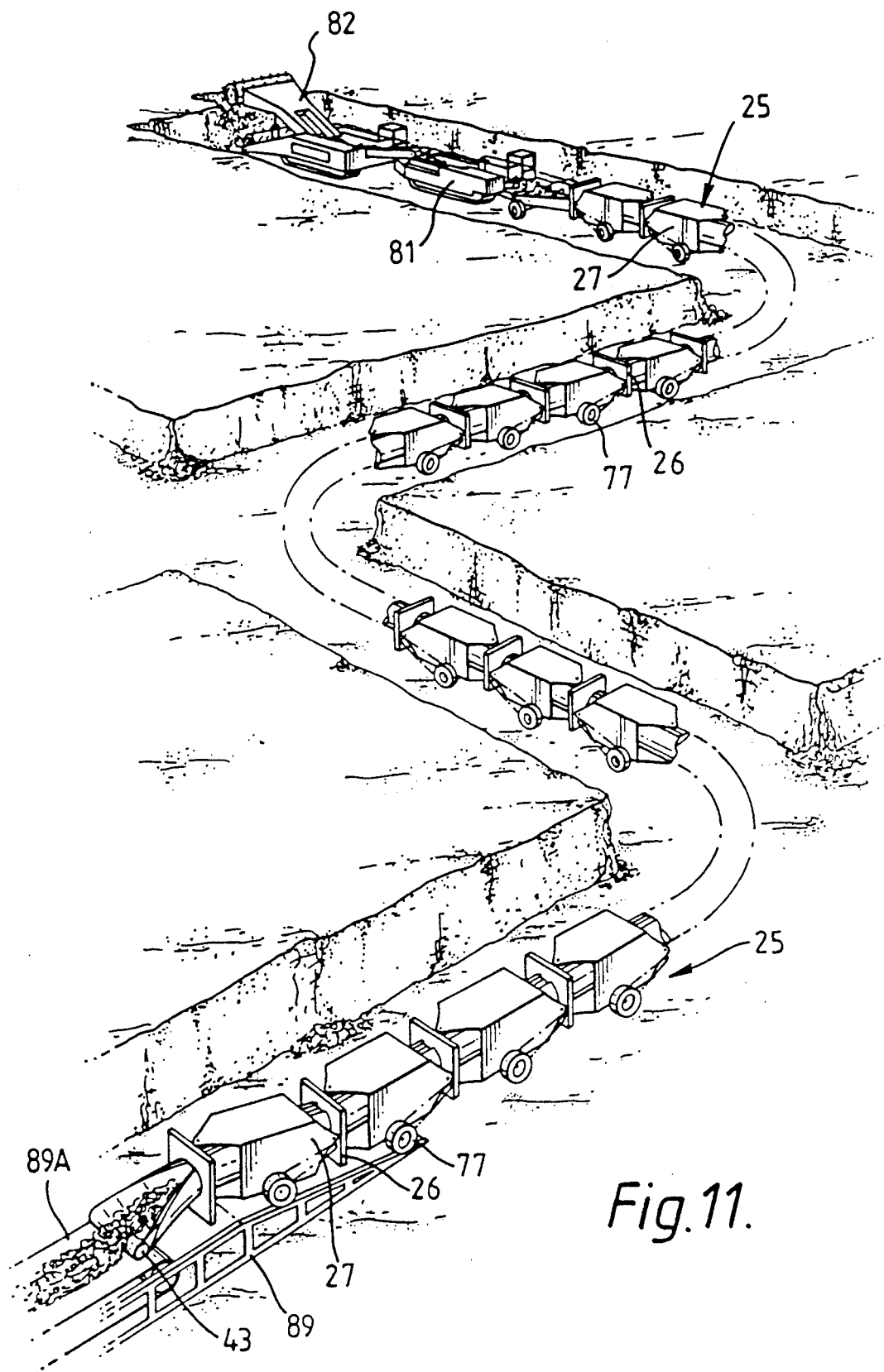
Figure 12:
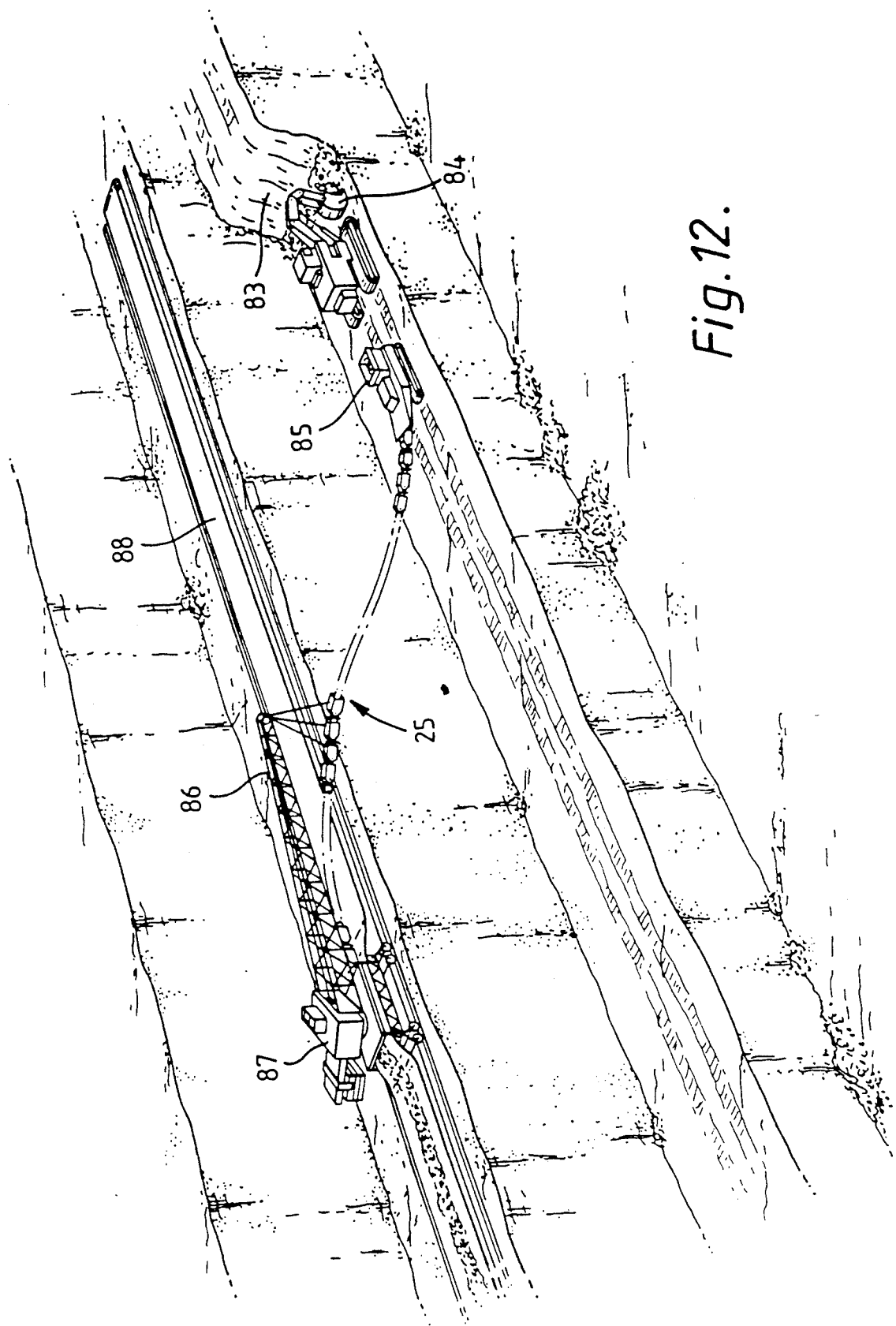
Figure 13:
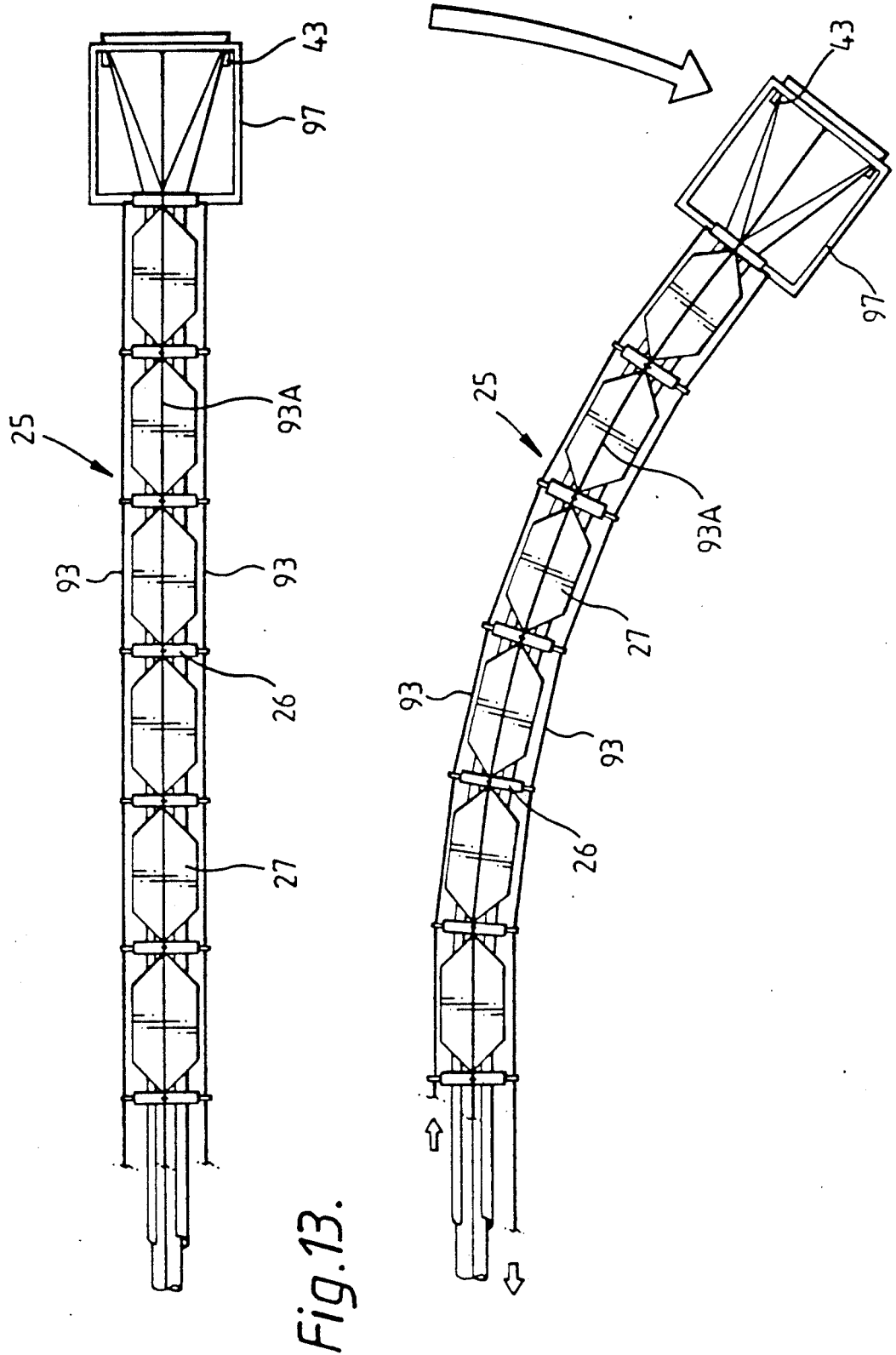
Figure 14:
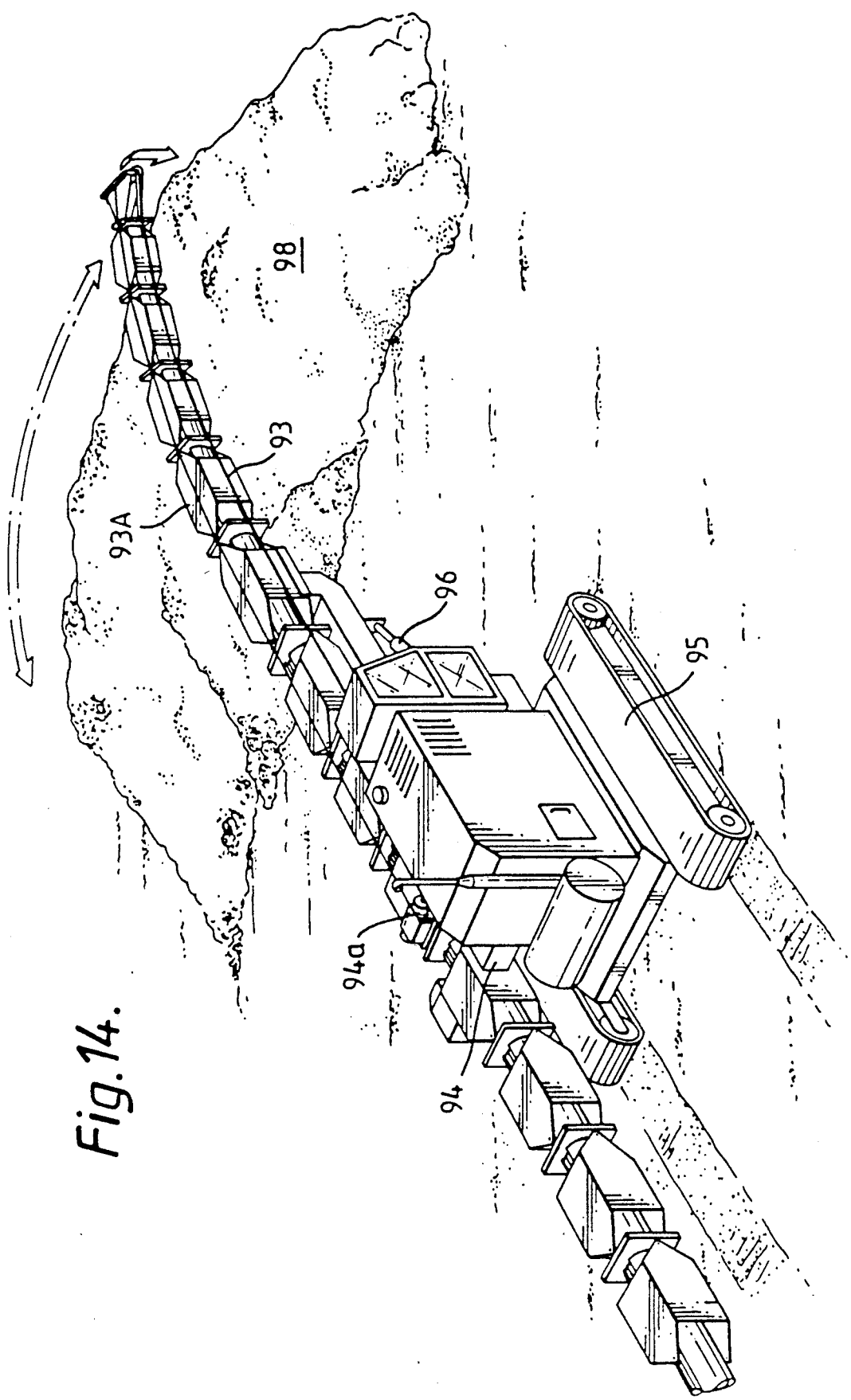

FIGS. 10 and 11 each represent a perspective view showing the pipe conveyor apparatus of the invention utilized in underground mining;

FIG. 12 shows a perspective of a piper conveyor apparatus of the invention used in an open cut mining application; and FIGS. 13-14 illustrate views of a pipe conveyor apparatus of the invention when used as a radial stacker.

Figure 3:
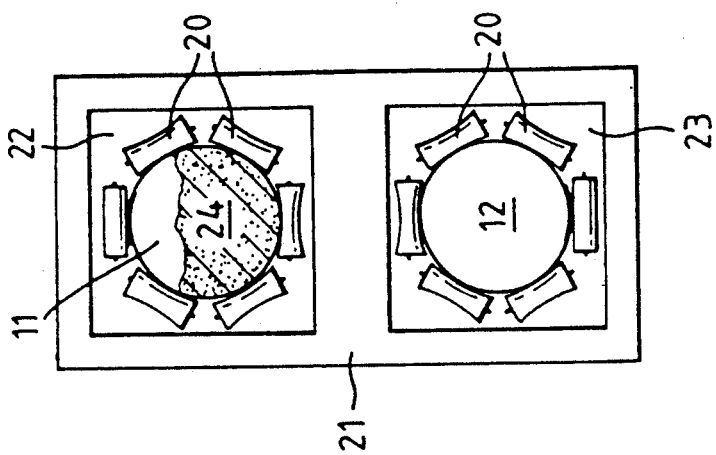
FIGS. 1-3 illustrate a conventional pipe conveyor system.
Figure 1:
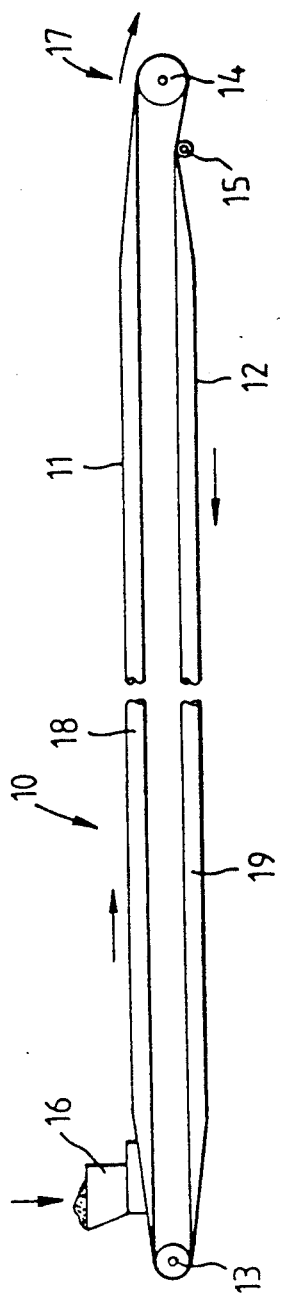
Figure 2:
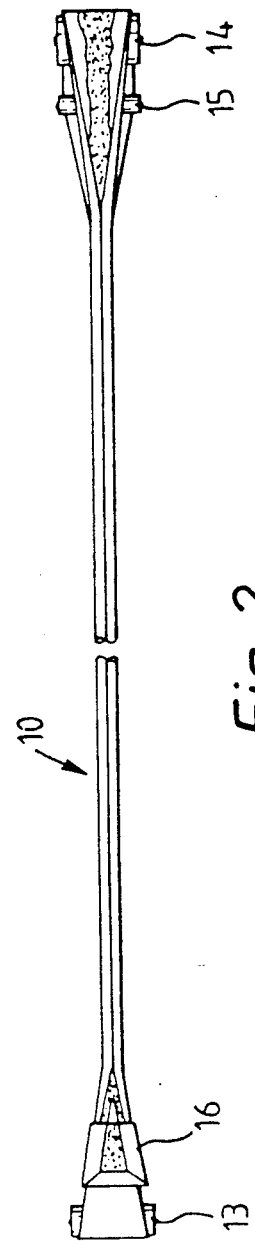

The conventional pipe conveyor apparatus 10 as shown in FIGS. 1-3 is typical of the prior art already discussed above and includes a forward run 11 and return run 12 driven by a head roller 14 and idler roller 13 and supported by intermediate idler rollers 15. There is also shown feed hopper 16 and delivery end 17. The endless belt 18 is maintained in a pipe of cylindrical shape 19 by peripheral rollers 20 located in a plurality of frame members 21 having an upper aperture 22 for forward run 11 and lower aperture 23 for return run 12. Forward run 11 transports particulate material 24 from feed hopper 16 to delivery end 17.

Figure 4:
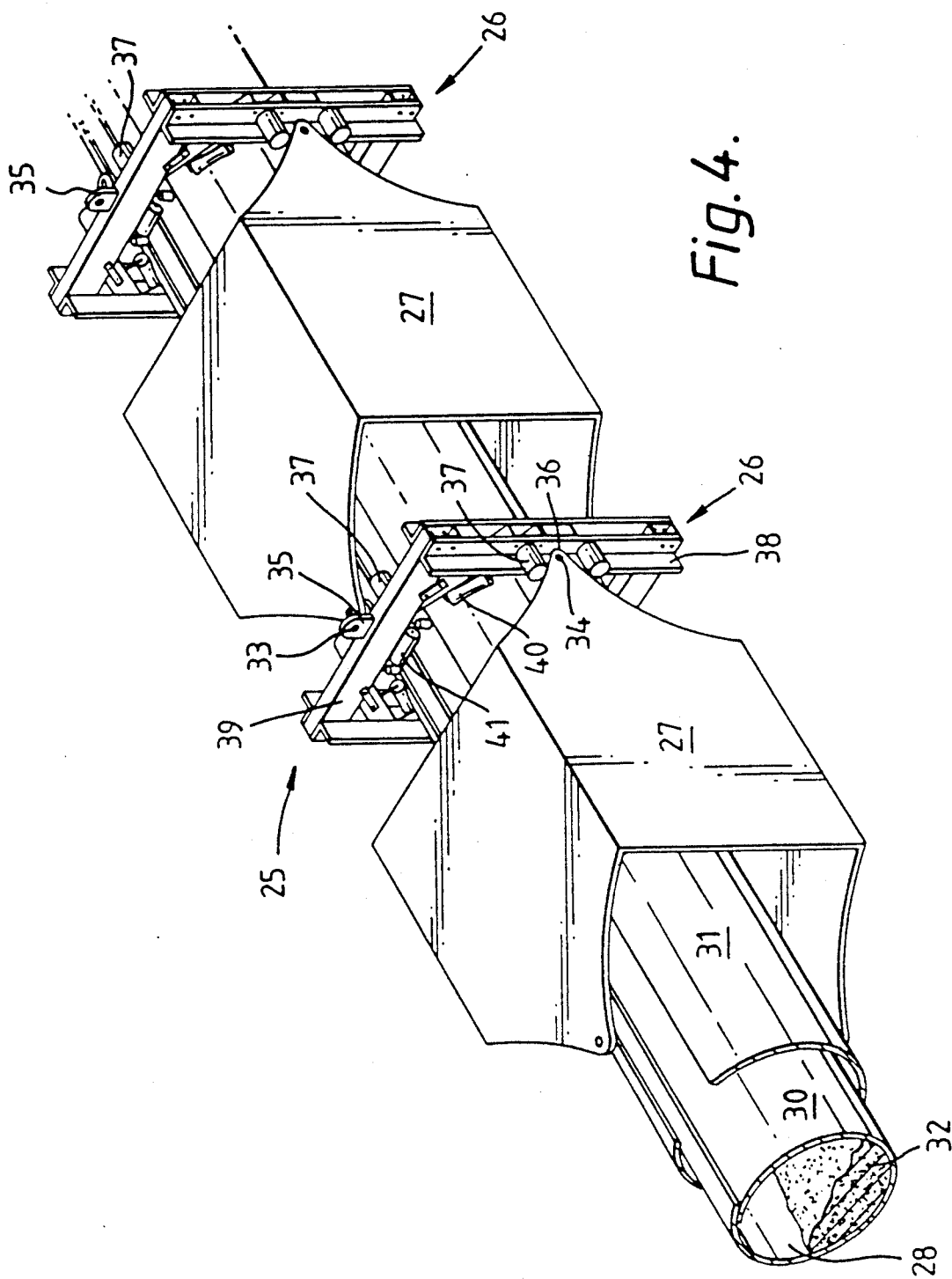
FIG. 4 represents a perspective view of an intermediate portion of pipe conveyor apparatus constructed in accordance with the invention.

In contrast in the pipe conveyor apparatus 25 constructed in accordance with the invention as shown in FIG. 4 there is provided spaced conveyor support frames 26 separated by articulated structure components 27. Support frames 26 and structure components 27 which may optionally be supported by ground engaging wheels (not shown) surround conveyor belt 28 which has a forward part or run 30 located within a return part or run 31. Forward run 30 carries particulate material 32 as shown.

A structure component 27 includes top attachement lugs 33 and side attachment lugs 34 which are pivotally attached to support frames at attachment lugs or locations 35 and 36 respectively so as to form a universal joint between component 27 and support frame 26. Also provided are stops 37 to limit the amount of relative pivotal movement between succeeding components 27 and support frame 26. Support frame 26 also includes uprights 38 and cross members 39 and peripheral rollers 40 as well as roller 41 which enables adjacent side edges 42 of conveyor belt 28 to overlap as best shown in FIGS. 6-8.

Figure 5:
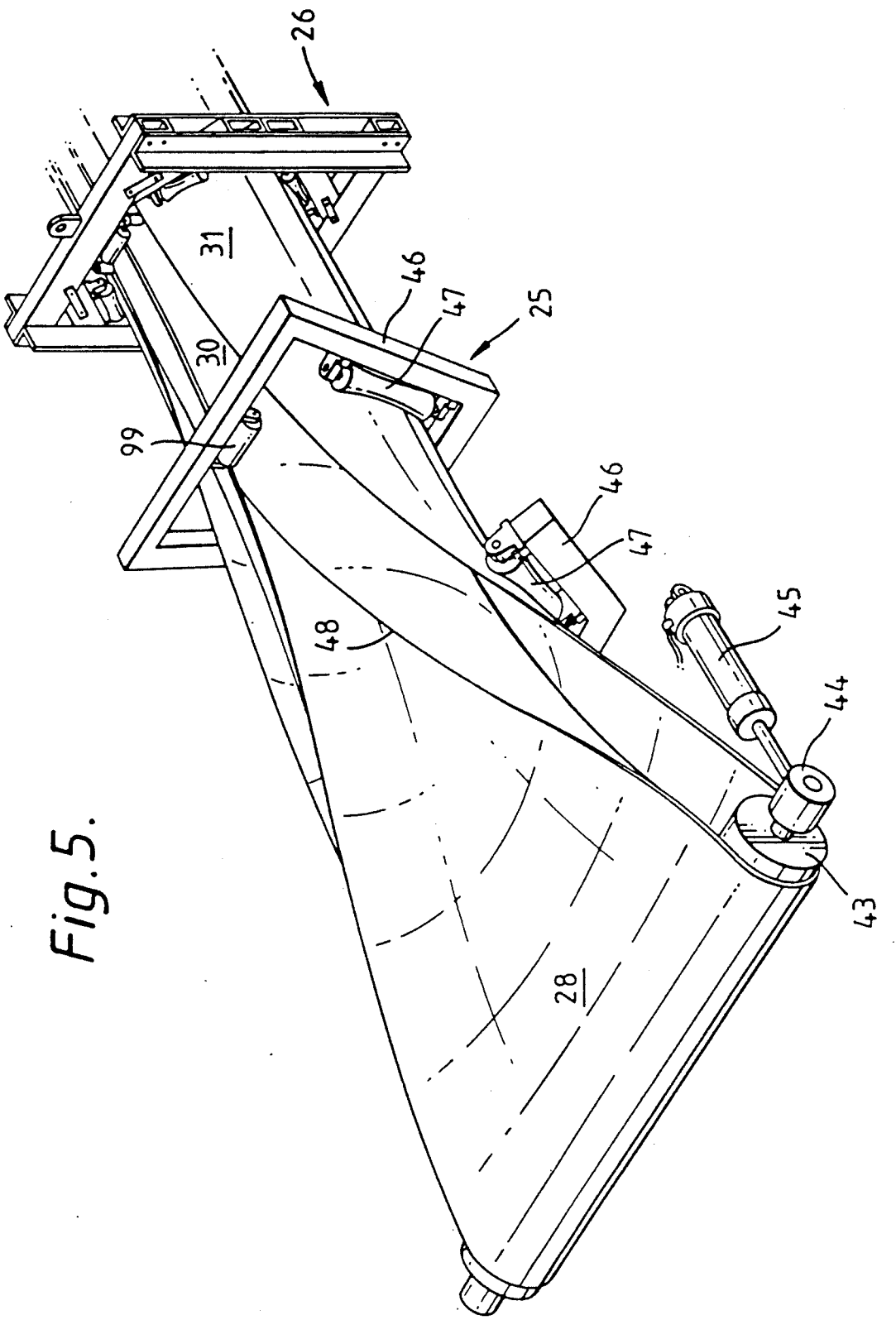
FIG. 5 represents a perspective view of an end portion of the pipe conveyor apparatus shown in FIG. 4.

In FIG. 5 there is shown end roller 43 having opposed bearings 44 and hydraulic ram assembly 45 for tensioning of belt 28 when required. As shown the return run 31 under the influence of guide frames 46 having idlers 47 will have its side edges 48 relax and gradually assume a planar orientation before engaging with head roller 43. There may also be a guide roller 99 fitted on the forward travel end of belt 48 to cushion the overlap between the belt edges. The belt 28 after passing over roller 43 may then form forward run 30 which is separated from return run 31 by spacer means as described hereinafter in FIGS. 6-9.

Figure 6:
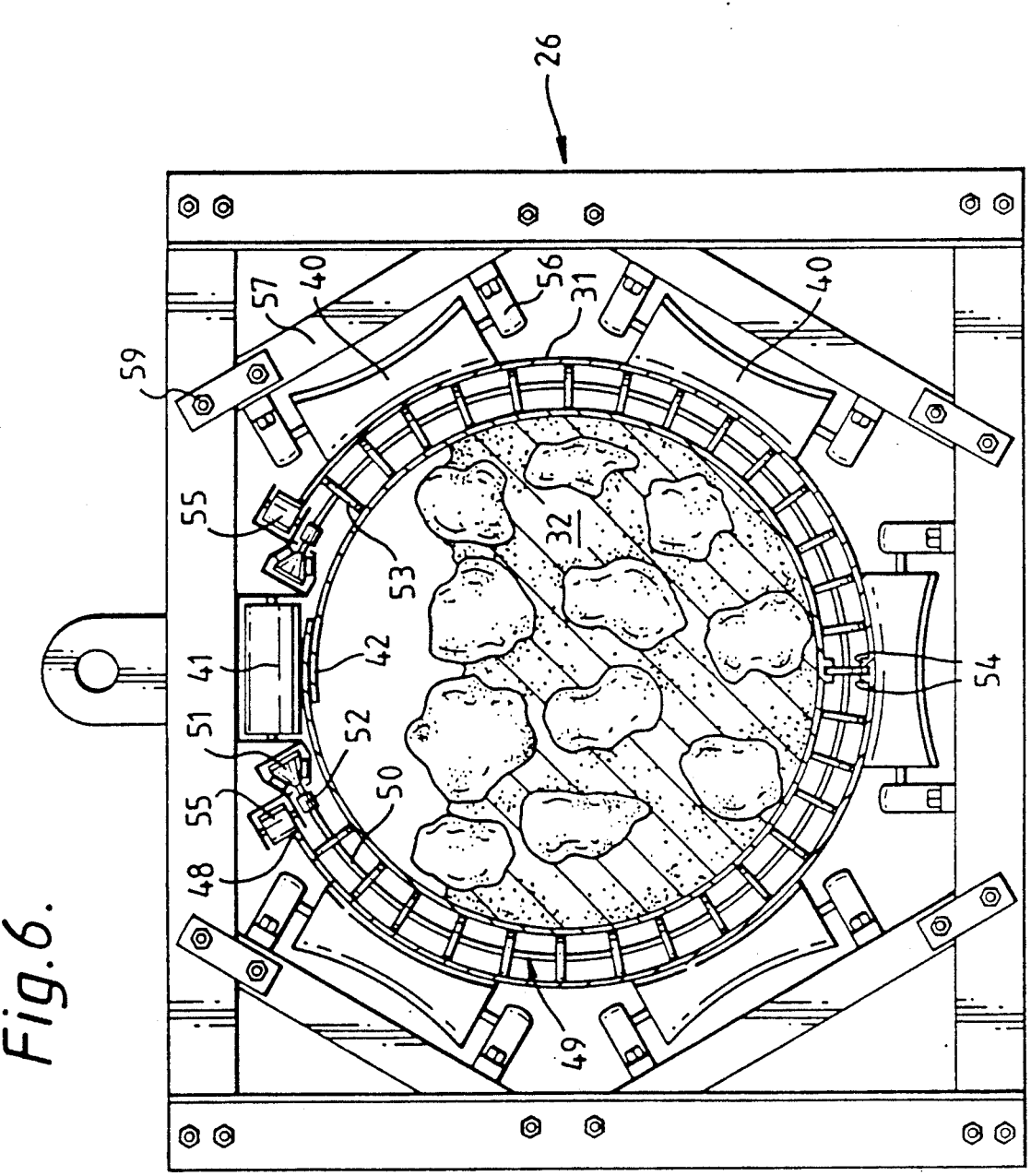
FIG. 6 represents a sectional view of the pipe conveyor apparatus of FIG. 4 showing a first type of spacer means.

In FIG. 6 one form of spacer means 49 is illustrated which has a curved flexible axle 50 rotatably supported by thrust bearings 51 and auxiliary bearings 52. Also attached to axle 50 are support discs 53 rigidly attached thereto. Also shown are anti-slewing ribs 54 as well as edge rollers 55 which bear against side edges 48 of return run 31. Peripheral rollers 40 which support return run 31 are supported in opposed bearings 56 which are supported by roller support members 57 attached to frame supports 26 at 59.

Figure 7:
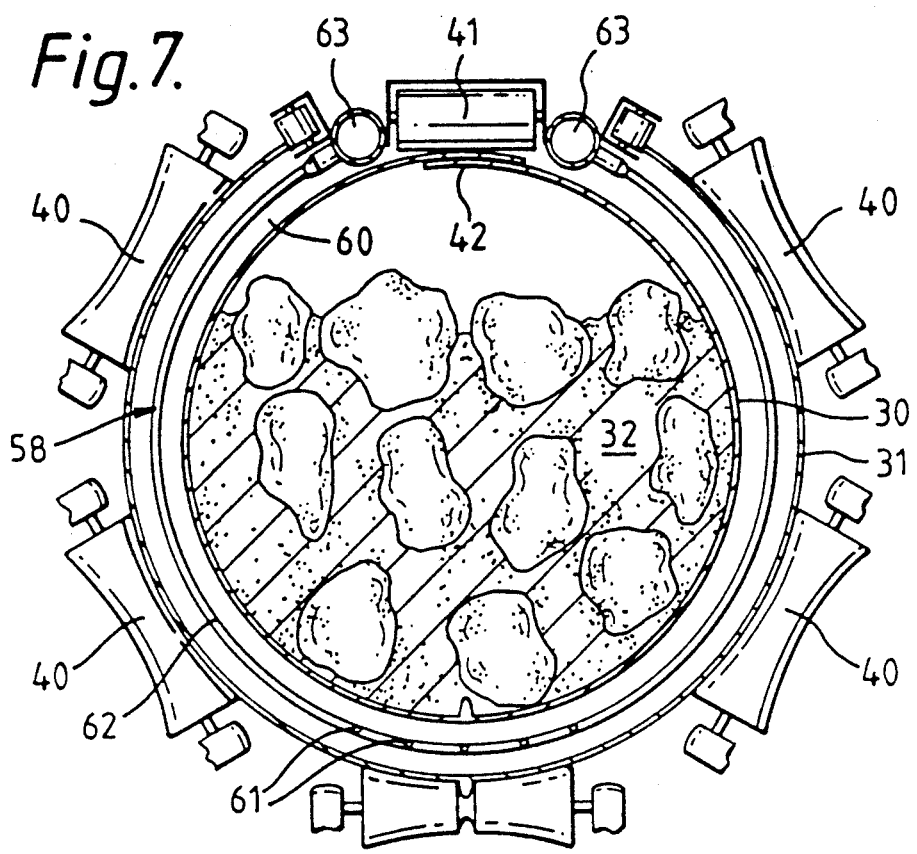
FIG. 7 represents a similar view to FIG. 6 showing a second type of spacer means.
Figure 8:
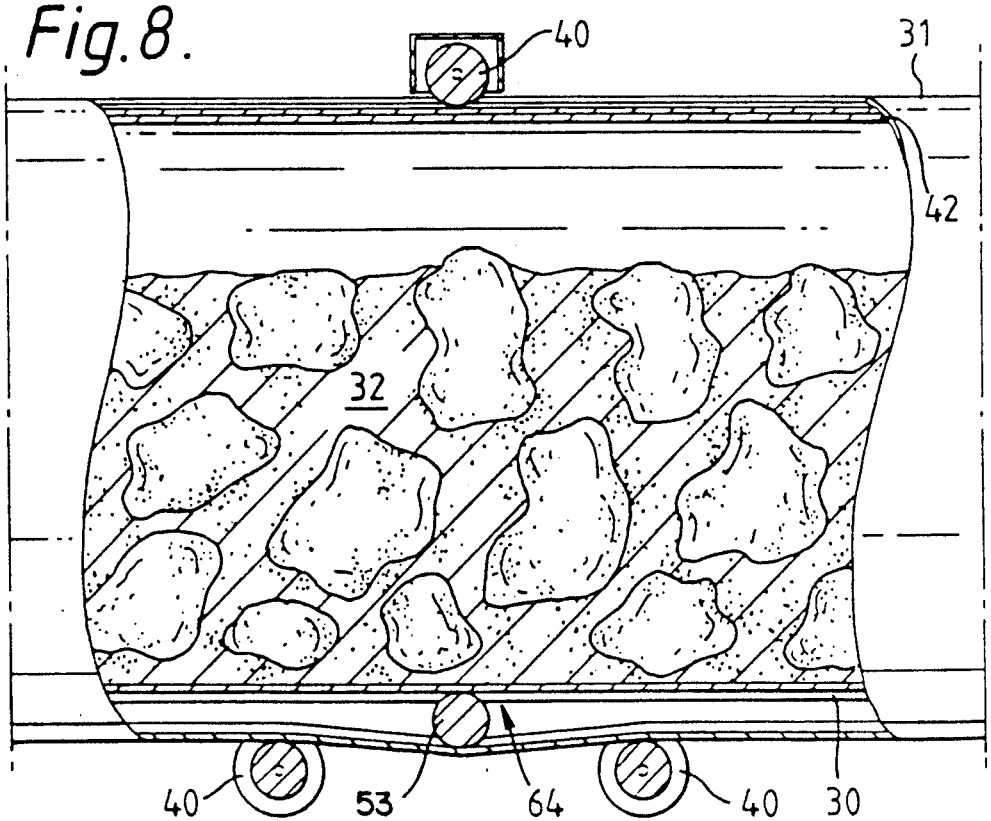
FIG. 8 represents a side view of the pipe conveyor apparatus of FIG. 4 showing a third type of spacer means.

In FIG. 7 another form of spacer means 58 is illustrated which comprises a pneumatic arrangement for injection of compressed air into space 60 located between forward run 30 and return run 31. Compressed air may be injected into space 60 from nozzles 61 located in delivery pipe 62 which communicates with compressed air hoses 63.

In FIG. 8 another form of spacer means 64 is illustrated which includes an inner set of rollers 65 which are located between forward run 30 and return 31. Inner rollers or idlers 65 are located between a pair of outer peripheral rollers 40 as shown.

Of the various forms of spacer means which have been illustrated in FIGS. 6-8 it is considered that the spacer means shown in FIG. 6 are preferred because of maintenance considerations. Thus inner rollers 65 may be relatively inaccessible whereas thrust bearings 51 are relatively accessible.

Figure 9:
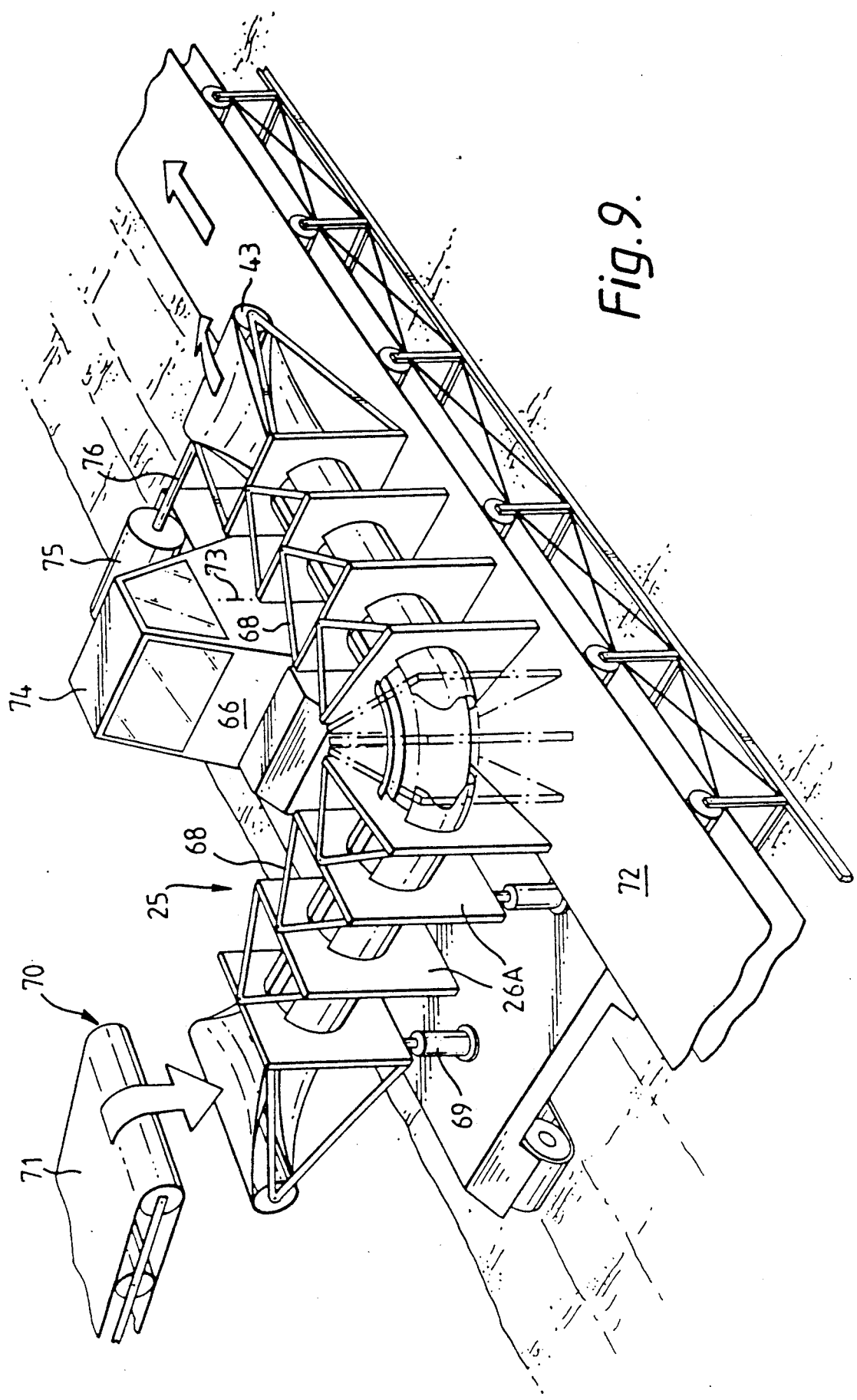
FIG. 9 represents a perspective view of the pipe conveyor apparatus of the invention attached to a mobile gantry vehicle.

In FIG. 9 there is shown a pipe conveyor 25 of the invention supported by a mobile gantry vehicle 66. In this arrangement the structure components 27 which are essentially used as spacers between adjacent support frames 26A are omitted for reasons of clarity and convenience and support frames 26 shown schematically have rigid links 68 interposed therebetween. Each support frame 26 may be supported by hydraulic ram assemblies 69 for height adjustment and also to vary the angle between loading end 70 and supply conveyor 71 which may supply mined material from a mine face. There is also shown delivery conveyor 72 whereby vehicle 66 may be utilized to effectively transfer material from supply conveyor 71 to delivery conveyor 72.

If desired in another possible arrangement each support frame may have rigid links 68 omitted and thus be movable about a horizontal axis as well as movable vertically for height adjustment purposes. In this case each support frame 26 may be attached to vertical hinge 73 which is attached to the cabin 74 of gantry vehicle 66. In this particular embodiment the pipe conveyor apparatus of the invention may adopt a tracking angular type of movement. Also shown is motor 75 which drives head roller 43 through output shaft 76.

In FIG. 10 there is shown pipe conveyor apparatus 25 of the invention utilized for the purpose of mining wherein each articulated structure component 27 is supported by ground engaging wheels 77. Material may be transferred to a fixed belt (not shown) at a discharge end 79 from a mining location 80 mined by face shovel or continuous mining machine 82 wherein mined material is passed to tracked head vehicle 81 for sizing and surge capacity. Material may then be transferred from loading end 82A of conveyor 82B to conveyor 25. Also movement of wheels 77 may be powered by chain drives 92 from the conveyor belt rollers 40.

In FIG. 11 in another embodiment of the invention a cut away perspective view of an underground mine is illustrated whereby continuous mining machine 82 passes mined material to a tracked conveyor head vehicle 81 which transfers material to pipe conveyor apparatus 25 as described in FIG. 10. The universal joint as described previously between support frames 25 and articulated structure components 27 are extremely useful for sloping or uncertain terrain. Material is transferred at discharge end 89 to fixed conveyor 89A.

In FIG. 12 there is shown pipe conveyor apparatus 25 of the invention used in an open cut mining situation wherein mined material is transferred from mine location 83 using face shovel 84 to a tracked conveyor head vehicle 85. In this embodiment pipe conveyor apparatus 25 is supported by a boom 86 of crane 87 whereby mined material may be passed to conveyor belt 88.

In FIGS. 13-14 reference is made to the pipe conveyor apparatus 25 of the invention having control cables 93 for effecting lateral and vertical movement of pipe conveyor apparatus 25. Movement of control cables 93 may be effected by control cable winches 94 which are associated with tracked vehicle 95 shown in FIG. 14. There is also provided hydraulic ram assemblies 96 which may be used to elevate pipe conveyor apparatus 25 when required. Alternatively, a third cable 93A and winch 94A may be used to control the vertical attitude of the apparatus 25. As best shown in FIGS. 13-14 upon release of control cables 93 stacker head 97 may be moved laterally shown by the arrow in FIG. 13. In this arrangement one cable 93 is slack and the other cable 93 is pulled as shown by the arrows to effect the lateral movement of stacker head 97. In this arrangement also a stock pile 98 may be efficiently and readily erected.

I claim:

1. Pipe conveyor apparatus comprising an endless conveyor belt having a forward part and a return part and a forward forming means for forming a section of the forward part into a substantially continuous form and return forming means for forming a section of the return part into a substantially continuous form, said substantially continuous forward section is surrounded by said substantially continuous return section, and a plurality of articulated structure components and a plurality of support frames wherein said support frame supports said substantially continuous return section and wherein each structure component is interposed between said adjacent support frames and pivotally attached to each of said adjacent support frames.

2. Pipe conveyor apparatus as claimed in claim 1 wherein said substantially continuous forward section is cylindrical.

3. Pipe conveyor apparatus as claimed in claim 1 wherein said substantially continuous return section is cylindrical.

4. Pipe conveyor apparatus as claimed in claim 1 wherein said return forming means includes one or more peripheral sets of rollers contactable with an outer surface of the return part.

5. Pipe conveyor apparatus as claimed in claim 4 further comprising a plurality of peripheral sets of rollers located along the length of said conveyor belt.

6. Pipe conveyor apparatus as claimed in claim 5 wherein said sets of rollers are supported by said plurality of support frames whereby each set of rollers is supported by a respective support frame.

7. Pipe conveyor apparatus as claimed in claim 1 further comprising overlapping means for causing opposed side edges of said forward part to overlap or be located adjacent to each other in relatively close proximity.

8. Pipe conveyor apparatus as claimed in claim 7 wherein said overlapping means is an overlapping roller which maintains the opposed side edges of the forward part in overlapping relationship.

9. Pipe conveyor apparatus as claimed in claim 1 further comprising edge means for maintaining opposed side edges of the return part in relative close proximity.

10. Pipe conveyor apparatus as claimed in claim 9 wherein said edge means comprises one or more edge rollers for bearing contact with an associated side edge of the return part.

11. Pipe conveyor apparatus as claimed in claim 1 wherein said forward forming means functions as a spacer between the forward part and the return part to maintain both return part and forward part in a spaced and co-axial orientation.

12. Pipe conveyor apparatus as claimed in claim 11 wherein said forward forming means includes one or more sets of inner rollers interposed between the forward part and the return part and contacting an undersurface of the forward part.

13. Pipe conveyor apparatus as claimed in claim 12 wherein said sets of inner rollers are supported by said plurality of support frames wherein a respective set of inner rollers are supported by a respective support frame.

14. Pipe conveyor apparatus as claimed in claim 13 further comprising a set of outer rollers wherein each outer roller is located between adjacent inner rollers.

15. Pipe conveyor apparatus comprising an endless conveyor belt having a forward part and a return part and forward forming means for forming a section of the forward part into a substantially continuous form and return forming means for forming a section of the return part into a substantially continuous form, said substantially continuous forward section is surrounded by said substantially continuous return section, said forward forming means functions as a spacer between the forward part and the return part to maintain both return part and forward part in a spaced and co-axial orientation, and said forward forming means includes a rotatably supported curved axle interposed between the forward part and the return part.

16. Pipe conveyor apparatus as claimed in claim 15 wherein said curved axle includes a multiplicity of support discs attached thereto.

17. Pipe conveyor apparatus comprising an endless conveyor belt having a forward part and a return part and forward forming means for forming a section of the forward part into a substantially continuous form and return forming means for forming a section of the return part into a substantially continuous form, said substantially continuous forward section is surrounded by said substantially continuous return section, said forward forming means functions as a spacer between the forward part and the return part to maintain both return part and forward part in a spaced and co-axial orientation, and said forward forming means includes means for injecting compressed air between the forward part and return part.

* * * * *